United States Patent Office 3,022,140
Patented Feb. 20, 1962

3,022,140
DETERMINATION OF DEPOSITIONAL WATER SALINITY
Arman F. Frederickson, Tulsa, Okla., John Hower, Jr., Missoula, Mont., and Robert C. Reynolds, Jr., Tulsa, Okla., assignors to Pan American Petroleum Corporation, Tulsa, Okla., a corporation of Delaware
No Drawing. Filed Mar. 5, 1958, Ser. No. 719,201
15 Claims. (Cl. 23—230)

This invention relates to geochemical prospecting and is directed particularly to geochemical prospecting for valuable deposits of minerals such as oil and gas and certain inorganic salts. More specifically, the invention is directed to methods of prospecting which involve determining the salinity of the water in which sedimentary formations have been laid down. This may be more briefly termed depositional water salinity, or simply sedimentation salinity. We have found that there is a direct relationship between depositional water salinity and the concentration of trace-element boron in the clay mineral illite.

It is generally believed that oil and gas are associated much more often with marine or salt-water sediments than with non-marine or fresh-water sediments. Accordingly, a convenient method of classifying samples of sedimentary formations as to whether they are of marine or non-marine origin is of distinct value in evaluating the likelihood of occurrence of petroleum deposits. Such classification is often done by study of the fossil materials contained in the recovered samples, but sometimes significant fossils are missing from the samples.

It has been and may be at the present time observed that changes in the salinity of sea water are most marked close to shore or in shallow waters. Where streams and rivers enter the sea from the adjacent land areas, the salinity varies from nearly zero to the relatively high values characteristic of the open ocean. Large variations of water salinity are often found around reefs and sand bars that are close to shore. These bars and reefs may impede the mixing of salt water and entering fresh water; or they may create lagoons and like areas of relatively quiet sea water, from which evaporation takes place and increases the salinity over that of the normal sea water.

After porous seashore sands, sand bars, limestone reefs, and the like have been buried by impermeable sediments, their importance as traps for the accumulation of valuable deposits of oil and gas can hardly be overestimated. Nevertheless, as these porous bodies are seldom associated with marked structural deformations of the surrounding strata, they are exceedingly difficult to locate by such surface geophysical methods as seismic geophysical surveying.

In view of the foregoing, it is a primary object of our invention to provide a method of exploring for valuable mineral deposits by measurements which indicate depositioned water salinity. A further object is to provide, for geochemical exploration, a method for determining, by measurements related to depositional water salinity, whether a given sedimentary formation is of marine or non-marine origin. A still further object is to provide a method for mapping depositional water salinity for a given sedimentary formation over a substantial area in such a way as to show ancient shore lines and the features associated therewith which are useful as traps for accumulating deposits of oil and gas. A still further object is to provide a method for preparing well logs of depositional water salinity of the formations penetrated by wells for purposes of well correlation, formation study, and the like. Still another and further object is to provide a method for mapping depositional water salinity of sedimentary formations over an area in such a way as to show the probable location of valuable mineral salt deposits. Other and further objects, uses, and advantages of the invention will become apparent as the description proceeds.

It has been generally known that the concentration of the trace-element boron and the total salinity of modern sea water are closely related. We have recently confirmed this knowledge by measuring the boron content and the salinity of a large number of samples taken from various places on the bottom of the Gulf of Mexico. We found, for example, that the salt content of the samples ranged from about 2 to about 80 parts per thousand, while the boron content was simultaneously varying from about .4 to about 10 parts per million. Despite the fact that the boron was present only in these trace-element concentrations, within these ranges the relationship between salinity and boron content was a straight line having the approximate empirical formula $$S = 8B - 1$$

where $S$ is the total salinity in parts per thousand and $B$ is the boron content in parts per million.

It has also been known in a general way that the boron content of certain shales varies with the salinity of the water from which the shales were deposited. Provided the lithology of the shale remained constant, valid comparisons of sedimentation salinity could be made on the basis of the ascertained contents of boron. When the lithology of the shale changed, however, valid comparisons could no longer be made, so that the utility of the boron determination was thus limited to relatively small areas.

Some evidence was obtained to show that the boron and the clay-mineral portion of the shale were related, but as the clay-mineral content of shales varies quite widely, the use of boron measurements as salinity indicators has heretofore been only qualitative and limited.

The term "clay minerals" is one that has acquired a definite meaning only within the last few years. Generally speaking, clay minerals are layer-lattice silicate minerals of very small particle size, being typically of less than 2 microns effective diameter. These particles occur in abundance in clays, shales, and like materials and are thus chiefly responsible for the characteristic properties of these materials. Thus, the property of clay of becoming plastic when slightly wetted is due chiefly to the presence of specific clay minerals, although in any given sample of natural clay substantial amounts of other well-known non-clay minerals are frequently also present.

Clay minerals are generally classifiable into one of two groups, either amorphous or crystalline, with the latter being by far the most abundant and important. Of the crystalline clay minerals there are several types classified on the basis of their crystal structure and chemical composition. Of a number of different types the four which are believed to be the most abundant and widely occuring are kaolinite, illite, montmorillonite, and chlorite. These resemble each other structurally in having the various ions arranged in sheets made up of multiple layers of ions but differ in the number of layers per sheet and in chemical composition.

Thus, kaolinite, which commonly occurs in fresh-water sediments, has its component ions arranged in two-layered sheets. Illite, which is abundant in many ancient marine shales, and montmorillonite, which occurs erratically, are similar in structure in that their ion sheets are three-layered. They differ in other respects such as chemical composition, however, illite containing potassium ions at definite places in its crystal lattices where montmorillonite does not. Chlorite, with four-layered ion sheets, is most often formed under chemically reducing conditions and is thus frequently an important constituent of black shales. There are several other known clay-mineral types, but they are of little importance here, as they are less abundant and less widely occuring than these four.

Any of these clay minerals, and others, may occur in relatively pure form, but it is much more common to find them in various mixtures. Montmorillonite, illite, and chlorite may not only be physically mixed, but, due perhaps to certain of their chemical and crystalline similarities, it is common to find them interlayered with each other within the crystal structure. Due to its different structure, however, kaolinite does not usually interlayer with any of the other three common clay minerals in forming clay-mineral mixtures.

As is to be expected from the extremely wide variety of conditions under which sedimentation and the forming of sedimentary rocks occurs, not only do other minerals intermix with these clay minerals when clays and shales are formed, but also these clay minerals may be present in varying amounts in other types of sedimentary rocks such as limestones and sandstones. We have observed, for example, that in limestones particularly, illite often may be present in almost pure form.

Briefly stated, our invention is based upon the discovery that there is a direct relationship between depositional water salinity at any time and place and the concentration of boron in the clay mineral illite then and there deposited. Furthermore, we have found that the boron is so held by the illite that various treatments of the samples to recover illite in substantially pure form are without noticeable effect on the results of the measurements. Accordingly, the measured boron content of the illite taken from a sedimentary earth sample, or in other words the measured boron-illite ratio, is proportional to the salinity of the water in which the illite was deposited, regardless of the lithology of the sample from which the illite is separated.

There are a number of possible methods of exploration based on this discovery. For example, by extracting the illite from a number of contemporaneously deposited samples systematically collected over a prospecting area and determining the boron-illite ratio for each sample, the values of the ratios may be plotted on a map of sample locations. Contouring this map with lines of equal ratio values will reveal a number of significant features. Generally, the contour lines will indicate the position of the ancient shore line existing when the formation sampled was laid down. The gradient will be greatest near the shore-line location, and abnormally steep gradients will suggest the possible presence of reefs or sand bars which, at the period of geologic time in question, inhibited the free movement of sea water to and from the shore line.

Often a simple comparison of the boron-illite ratios of contemporaneous samples taken from two wells spaced somewhat apart, but not too widely, may be significant. If the difference in values of the ratio is small, then there was probably free circulation of water between the well locations at the time the samples were deposited. If the difference is large, however, then some reason for it should be sought. A barrier reef or sand bar could have been responsible and should be suspected unless some other cause is established.

In drilling a well, systematically taking samples from various depths, as by recovering cores or cuttings, separating the illite from the samples, and determining the ratio of boron to illite will permit drawing a salinity versus depth well log. Thick shale sections which are difficult to differentiate in any other way may be expected to show salinity markers. Salinity logs of a well, or of several wells over an area, can be used for establishing a correlation between wells, for identification, study, and evaluation of the properties of formations, and for other purposes that logs measuring other properties of the formations are now used.

Boron compounds are some of the most soluble salts in sea water. Accordingly, when evaporation from a closed body of sea water so increases the salinity that precipitation of salt takes place, the boron-illite ratios of the associated sediments will continue to increase in the direction of the final deposition of salt crystals from the water. It is at this location that the boron salts will be concentrated, and accordingly this constitutes an efficient method of prospecting for such boron-rich salt deposits.

Regardless of the source or nature of the samples or of the use to be made of the results, an essential first step of the analysis is to disaggregate the samples as completely as possible into their constituent mineral grains. Acid-soluble materials such as limestone are preferably first dissolved in an acid, such as dilute hydrochloric acid of about 15 percent strength, for example. The insoluble residue, or the sample itself in the case of acid-insoluble materials, may then be subjected to sonic radiation under water. Ultrasonic or sonic waves of proper frequency and amplitude tend to effectively disaggregate the sample without substantially altering the natural grain sizes and size distributions, such as would occur if the sample were mechanically ground or crushed.

After a sufficient length of time of exposure to the sonic or ultrasonic waves, the disaggregation becomes effectively complete. The length of time required to disaggregate a sample varies according to the nature of the sample and the strength and frequency of the ultrasonic waves, but in an apparatus we have employed, operating at about 16,000 cycles per second, shale samples typically are disaggregated after about two or three hours. The clay-size mineral particles of the sample of two microns and less effective diameter mostly remain suspended in the water, while the larger particles settle out. A preliminary separation on the basis of particle size is therefore easily effected by decanting or drawing off the top portion of the liquid containing the suspended clay particles, leaving the settled larger particles behind at the bottom of the container.

This preliminary particle-size separation eliminates a major portion of the sources of error in the final determination of the boron-illite ratio. Thus, quartz, feldspar, and like minerals, which would act as diluents to reduce the accuracy of the quantitative determinations of boron and illite, are mostly left behind. Detrital mica grains from the weathering of granite and the like, which are substantially identical to illite in crystal structure and chemical composition, except that they ordinarily do not contain boron in the trace-element proportions related to depositional water salinity, are substantially eliminated. Likewise, tourmaline grains, which contain about 3 percent boron and thus even in small amounts constitute a serious contaminant for the determination of boron in trace quantities, are also left behind.

The fine or clay-mineral fractions of 2 microns and smaller particle size, which is suspended in the water decanted from the larger settled particles, is then flocculated and settled out by suitable treatment, such as by slightly acidifying the water. The settling may be advantageously speeded up by centrifuging. The clay solids so recovered are then subjected to a chemical treatment adapted to remove substantially all of the clay minerals except illite. The first step of this treatment preferably comprises treating with hot alkali, as by boiling the clay-mineral solids in a concentrated, say 6 N, solution of sodium hydroxide for a period of time, typically about four hours. This treatment slowly dissolves kaolinite, chlorite, montmorillonite, mixed-layered illite-montmorillonite, and other clay minerals present in minor amounts. We have found, however, that compared to all the other clay minerals normally encountered, illite is relatively resistant to this treatment. Although it is attacked by the alkali to some extent, the mineral illite constitutes most of the insoluble residue left at the completion of the hot alkali treatment.

This illite residue is then dispersed in distilled water and washed to remove the soluble products of the hot alkali attack as completely as possible. Following this washing treatment, the sample residue is subjected to further treatment by hot acid, such as by boiling in hot dilute (say 1 N) hydrochloric acid for a period of time, typically about one hour. This further dissolves and washes away the products of alkali decomposition and thus substantially completes the destruction of montmorillonite and mixed-layered illite-montmorillonite. What is left behind is an insoluble residue that is frequently almost 100 percent illite. The final residue is again washed in distilled water to remove all soluble products of the chemical treatment as completely as possible, and the finally recovered insoluble residue is then ready for chemical analysis for boron and illite.

Since illite is distinguished from the other common clay minerals chiefly by its content of potassium, the percentage of illite in the final solid sample may be determined by spectrographic analysis for potassium. This can, of course, be done in any of several different ways. A preferred method is to excite the fluorescence of the potassium in the sample by irradiation by X-rays of sufficient energy. For example, X-rays of 50,000 volts or more energy will excite the $K\alpha$ and other characteristic radiations of the potassium ion. The fluorescence thus excited by X-rays is analyzed by a crystal-grating spectrograph, and the amount of potassium is estimated from the size of the $K\alpha$ radiation peak for a standard X-ray intensity. Preferably this is done by scanning through the fluorescence spectrum with a counter-type detector while continuously recording the counting rate on a strip chart recorder. Comparison of the peaks produced by the unknown and by a standard illite of known 85 percent purity gives the purity of the unknown. Percentages of illite found in samples purified in accordance with the foregoing procedures are normally at least 60 percent and very frequently are in the range of 80 to 100 percent. It is estimated that the measurement of the illite content of the final sample can be made in this way with an accuracy of 5 to 10 percent. The advantage of the X-ray fluorescence type of measurement, of course, is that the sample is not destroyed or adversely affected by the X-rays but remains available for further analysis or other uses.

The boron content of the sample may be determined by any of several methods, but one of the most satisfactory appears to be measuring the intensity of the emission spectrum which is excited by placing a small amount of the sample on a carbon-arc electrode. This arc then forms the light source for a conventional grating spectrograph. Preferably an internal standard is employed by mixing with the illite sample a known proportion of a mineral containing an element such as beryllium which behaves similarly to boron during excitation. A film strip is exposed in the spectrograph, and the analysis for boron comprises measuring the film density ratio for the characteristic boron emission at 2498 Angstrom units relative to a beryllium spectral line close by. The results of this measurement, interpreted with the aid of a calibration curve made with known boron concentrations, typically vary from about 50 to about 2,000 parts per million of boron.

The boron measurements are normalized to take account of the concentration of illite in the bulk sample. For example, if the content of boron is determined to be 200 parts per million in the bulk sample, whereas the percentage of illite is determined to be 80 percent, the indicated boron content must be multiplied by a factor of 5/4, to yield a result of 250 parts per million of boron in terms of a sample 100 percent illite.

These results have the following significance: For boron contents of 100 parts per million and less in illite, the indicated depositional water salinity is such that the sediments are considered fresh-water in origin. A group of samples averaging about 200 parts per million of boron in illite gave evidences of being partly marine and partly non-marine in origin. A substantial number of samples known to be marine in origin gave, with only a few minor exceptions, boron contents of 250 parts per million to more than 500 parts per million, whereas a number of samples taken from an evaporite formation, where there was evidence that the salt content had been increased by evaporation far beyond normal marine conditions, gave boron-illite ratios as high as 1,500 to 2,000 parts per million. Thus, in summary it may be stated that a boron-illite ratio, measured according to the foregoing procedure, of above 200 or 250 parts per million indicates a probable marine environment of deposition of the sedimentary formation, whereas a ratio of less than 100 parts per million indicates that the deposition occurred in relatively fresh water. Between 100 and 200 parts per million is a region of uncertainty as to probable sample origin, the indicated salinity being between fresh water and normal sea water, and thus perhaps representing a mixing zone.

Besides thus identifying the probable depositional environment as marine, non-marine, or intermediate, the data provided by the present invention can be used in any of the several ways mentioned above; that is, for making direct comparisons between two wells, or for preparing contour maps, well logs, and the like.

We have so far not been able to establish conclusively the exact reasons why the boron-illite ratio is proportionally related to depositional water salinity and remains so throughout the drastic treatment employed in sample purification. It is believed, however, that a boron ion occasionally replaces a silicon ion in the silica sheets of the crystalline illite. Once this replacement occurs the boron ion is so firmly held as to resist all chemical attacks short of complete dissolution of the crystal. The replacement appears to occur substantially in proportion to the boron content and hence also in proportion to the total salinity of the water at the time and place of sedimentation.

While we have described our invention in terms of the foregoing specific details and examples, it is to be understood that further details and methods of use of the invention for exploration for minerals will be apparent to those skilled in the art. The invention therefore should not be considered as limited to the details described, but its scope is to be ascertained from the appended claims.

We claim:

1. A method of prospecting for subsurface mineral deposits which may be related to variations in depositional water salinity, which method comprises the steps of systematically collecting illite-containing sedimentary earth samples from spaced points of a prospecting area, quantitatively analyzing each of said samples for the ratio of boron to illite in the clay-mineral fraction thereof, and correlating the measured values of said ratio with the corresponding sample locations in said area, whereby the variations in depositional water salinity in said area, proportional to the variations in said ratio, may be ascertained.

2. A method of prospecting for subsurface mineral deposits which may be associated with variations in depositional water salinity, which method comprises the steps of systematically collecting contemporaneously deposited illite-containing sedimentary earth samples from spaced points of the area to be prospected, quantitatively analyzing each of said samples for the ratio of boron to illite in the illite clay-mineral fraction thereof, and correlating the measured values of said ratio with the locations of the corresponding sample points on a map of said area, whereby contour lines can be drawn showing the variations, over said area, of said ratio and of the depositional water salinity proportional thereto.

3. A method of prospecting for subsurface mineral deposits in the region between two spaced wells, which deposits may be associated with variations in depositional water salinity, which method comprises the steps of recovering from each of said wells one of a pair of illite-containing sedimentary earth samples which were deposited contemporaneously with each other and with the formation to be prospected for said mineral deposits, and quantitatively analyzing each of said samples for the ratio of boron to illite in the illite clay-mineral fraction thereof, whereby the difference in said ratios, proportional to the difference in depositional water salinity at the locations of said two wells, may be determined.

4. A method of logging a well which comprises the steps of recovering a plurality of sedimentary illite-containing earth samples from a plurality of depths in said well, quantitatively analyzing each of said samples for the ratio of boron to illite in the illite clay-mineral fraction thereof, and graphically plotting the values of said ratio in correlation with the depths in said well from which the corresponding samples were taken, whereby an envelope line can be drawn forming a log of said ratio as a function of depth, which log is proportional to the depositional water salinity as a function of depth.

5. In mineral prospecting, the method of classifying a sedimentary illite-containing formation as to whether it is probably of marine or non-marine origin, which method comprises the steps of obtaining a sample of said formation, and quantitatively analyzing the clay-mineral fraction of said sample for the ratio of boron to illite therein, whereby values of said ratio substantially greater or less than about 200 parts per million may be ascertained, respectively indicating the degree to which said formation was developed in a highly saline, normal marine or non-marine environment.

6. In a method of prospecting for subsurface mineral deposits which may be associated with variations in depositional water salinity, the steps which comprise disaggregating each of a plurality of illite-containing sedimentary earth samples taken from spaced points of a prospecting area into its constituent mineral grains without substantially altering the natural sizes of said grains, separating the clay-mineral fraction of each of said samples from the remainder thereof by selecting substantially only the particles of sizes smaller than about 2 microns diameter, treating the clay-mineral fraction so separated to recover relatively pure illite therefrom, and measuring the ratio of boron to illite in each recovered illite sample, whereby the measured values of said ratio may be correlated with the locations of the corresponding sample points on a map of said prospecting area to show the variations of the depositional water salinity which are proportional to the variations of said ratio.

7. In a method as in claim 6, wherein said samples contain readily acid-soluble minerals such as carbonates, the additional step of dissolving said acid-soluble minerals in acid prior to said disaggregating step.

8. In a method of prospecting for subsurface mineral deposits in the region between two spaced wells, which deposits may be associated with variations in depositional water salinity, the steps which comprise separating the clay-mineral fraction from each of a pair of sedimentary illite-containing, contemporaneously formed earth samples each taken from one of said wells, and quantitatively analyzing the clay-mineral fraction of each of said samples for its ratio of boron to illite, whereby any difference in depositional water salinity associated with said mineral deposit and proportional to the difference in said ratios may be ascertained.

9. In a method of logging a well for variations in depositional water salinity of the well formations with depth, the steps which comprise separating from each of a plurality of samples taken from different depths in said well a clay-mineral fraction containing illite, and quantitatively determining the ratio of boron to illite in each of said separated clay-mineral fractions, whereby the values of said ratio may be graphically plotted in correlation with depths of the corresponding samples in said well so that a depth-envelope line can be drawn forming a log of said ratio as a function of depth, which log is proportional to the variations of depositional water salinity as a function of depth.

10. In a method of prospecting for mineral deposits, the steps which comprise separating from each of a plurality of samples taken at spaced points of a prospecting area a clay-mineral fraction containing illite, treating said clay-mineral fraction of each sample to substantially dissolve all clay minerals therein other than illite and leave illite as a substantially insoluble residue, and quantitatively determining the boron to illite ratio of said insoluble residue of each sample, whereby the variations in depositional water salinity over said prospecting area, which are proportional to the variations in value of said ratio, may be ascertained.

11. A method of prospecting for subsurface mineral deposits which may be related to variations in depositional water salinity, which method comprises the steps of collecting illite-containing sedimentary earth samples from spaced points of a prospecting area, separating from each of said samples the fraction thereof of particle sizes less than about two microns diameter containing clay minerals including said illite, treating said fraction to remove substantially all possible boron-containing clay minerals other than illite, quantitatively measuring the concentration of said illite in said treated fraction, quantitatively measuring the concentration of boron in said treated fraction, whereby the ratio of said boron to said illite may be ascertained, and correlating the measured values of said ratio with the corresponding sample locations in said area, whereby the variations in depositional water salinity in said area, proportional to the variations in said ratio, may be ascertained.

12. A method of prospecting for subsurface mineral deposits which may be associated with variations in depositional water salinity, which method comprises the steps of collecting contemporaneously deposited illite-containing sedimentary earth samples from spaced points of the area to be prospected, recovering from each of said samples the clay-mineral fraction thereof having particle sizes less than about two microns effective diameter, while discarding along with the larger particle-size fraction of said sample the non-clay minerals likely to contain boron, concentrating the illite in said clay-mineral particle-size fraction, measuring the concentration of said illite, measuring the boron content of said concentrated illite fraction to ascertain the ratio of boron to illite in said sedimentary earth sample, and correlating the measured values of said ratio with the locations of the corresponding sample points on a map of said area, whereby contour lines can be drawn showing the variations, over said area, of said ratio and of the depositional water salinity proportional thereto.

13. A method of prospecting for subsurface mineral deposits in the region between two spaced wells, which deposits may be associated with variations in depositional water salinity, which method comprises the steps of recovering from each of said wells one of a pair of illite-containing sedimentary earth samples which were deposited substantially contemporaneously with each other and with the formation to be prospected for said mineral deposits, separating from each of said samples the fraction containing the particles of clay-mineral size of less than about two microns effective diameter, treating said separated fractions to remove substantially all possible boron-containing clay minerals other than illite therefrom leaving said illite as a major residual constituent of each of said fractions, quantitatively measuring the concentrations of illite and of boron in each of said treated fractions to obtain a boron-illite ratio therefor, whereby the difference in said ratios, proportional to the difference in depositional water salinity at the locations of said two wells at the time of deposition of said samples, may be determined.

14. A method of logging a well which comprises the steps of recovering a plurality of sedimentary illite-containing earth samples from a plurality of depths in said well, treating each of said samples to obtain a corresponding residue therefrom comprising essentially only said illite along with non-boron-containing minerals of similar particle size to said illite, measuring quantitatively the concentration of said illite in each said residue, measuring quantitatively the concentration of boron in each said residue to obtain a boron-illite ratio characterizing said corresponding sample, and graphically plotting the values of said ratio in correlation with the depths in said well from which the corresponding samples were taken, whereby an envelope line can be drawn forming a log of said ratio as a function of depth, which log is proportional to the depositional water salinity as a function of depth.

15. In mineral prospecting, the method of classifying a sedimentary illite-containing formation as to whether it is probably of marine or of non-marine origin, which method comprises the steps of obtaining a sample of said formation, treating said sample to separate a fraction containing said illite and non-boron-containing minerals of similar particle size therefrom, quantitatively measuring the concentration of said illite in said separated fraction, and quantitatively measuring the concentration of boron in said separated fraction, whereby the ratio of boron to illite for said sample may be determined, such that values of said ratio substantially greater or less than about 200 parts per million may be ascertained, respectively indicating the degree to which said formation was developed in a highly saline or a normal marine, or in a non-marine environment.

References Cited in the file of this patent
UNITED STATES PATENTS 2,367,592   McDermott _____ Jan. 16, 1945

OTHER REFERENCES

Goldschmit et al.: "Zur Geochemie des Bors," Nachr. Gesellsch. Naturwissensch., Gottingen, Math.-Phys., Klasse III, 25, IV, 27, 1932, page 402f.

Serdyunchenko: Chem. Abstr., vol. 51, 1957, page 7978a.

BFG, ibid., page 14178e.

Okada: "Chem. Abstr.," vol. 50, 1056, page 128g.

Serdyunchenko, ibid., page 2373f.